United States Patent
Chowdhury et al.

(10) Patent No.: US 8,404,392 B2
(45) Date of Patent: Mar. 26, 2013

(54) METHOD OF ENTERING AND EXITING A REGENERATIVE/STAND-BY MODE ON A FUEL CELL SYSTEM WHERE THE FUEL CELL IS SEPARATED FROM THE REGENERATIVE SOURCE BY A BLOCKING POWER DIODE

(75) Inventors: Akbar Chowdhury, Pittsford, NY (US); Kristian M. Whitehouse, Denver, CO (US)

(73) Assignee: GM Global Technology Operations LLC, Detroit, MI (US)

( * ) Notice: Subject to any disclaimer, the term of this patent is extended or adjusted under 35 U.S.C. 154(b) by 427 days.

(21) Appl. No.: 12/751,361

(22) Filed: Mar. 31, 2010

(65) Prior Publication Data

US 2011/0244346 A1   Oct. 6, 2011

(51) Int. Cl.
*H01M 8/06* (2006.01)
(52) U.S. Cl. ........ 429/427; 429/428; 429/429; 429/430; 429/431; 429/432
(58) Field of Classification Search ........... 429/427–432
See application file for complete search history.

(56) References Cited

U.S. PATENT DOCUMENTS

2004/0125518 A1* 7/2004 Moran et al. ............... 361/23

* cited by examiner

*Primary Examiner* — Patrick Ryan
*Assistant Examiner* — Ben Lewis
(74) *Attorney, Agent, or Firm* — John A. Miller; Miller IP Group, PLC

(57) ABSTRACT

A method for operating a fuel cell stack where electrical energy from regenerative braking is used to operate system loads instead of using fuel cell stack power to conserve hydrogen. A fuel cell stack and an ultracapacitor are electrically coupled to a high voltage electrical bus. A by-pass line is provided around a blocking diode including a by-pass contactor. A stack contactor is provided to disconnect the fuel cell stack from the electrical bus. A stand-by mode request is made if the voltage at a node proximate to the blocking diode closest to the ultracapacitor is higher than the voltage at a node proximate to the blocking diode closest to the fuel cell stack. Steps are then made to electrically prepare the high voltage electrical bus. Then, the stack contactor is opened and the by-pass contactor is closed to allow the regenerate braking energy to power the system loads.

20 Claims, 3 Drawing Sheets

US 8,404,392 B2

METHOD OF ENTERING AND EXITING A REGENERATIVE/STAND-BY MODE ON A FUEL CELL SYSTEM WHERE THE FUEL CELL IS SEPARATED FROM THE REGENERATIVE SOURCE BY A BLOCKING POWER DIODE

BACKGROUND OF THE INVENTION

1. Field of the Invention

This invention relates generally to a method for entering and exiting a stand-by mode for a fuel cell system and, more particularly, to a method for entering and exiting a regenerative/stand-by mode for a fuel cell system where the fuel cell is separated from a regenerative source by a blocking power diode.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL), that protects the mechanical integrity of the membrane and helps in uniform reactant and humidity distribution. The part of the MEA that separates the anode and cathode flows is called active area, and only in this area the water vapors can freely exchange between the anode and cathode. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a reaction by-product. The fuel cell stack also receives an anode hydrogen reactant gas that flows into the anode side of the stack. The stack also includes flow channels through which a cooling fluid flows.

A fuel cell stack includes a series of bipolar plates positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a supplemental power source in addition to the fuel cell stack, such as a high voltage DC battery or an ultracapacitor. The power source provides supplemental power for the various vehicle auxiliary loads, for system start-up and during high power demands when the fuel cell stack is unable to provide the desired power. The fuel cell stack provides power to an electric traction system through a DC high voltage electrical bus for vehicle operation. The battery or ultracapacitor provides supplemental power to the electrical bus during those times when additional power is needed beyond what the stack can provide, such as during heavy acceleration. For example, the fuel cell stack may provide 70 kW of power. However, vehicle acceleration may require 100 kW of power. The fuel cell stack is used to recharge the battery or ultracapacitor at those times when the fuel cell stack is able to provide the system power demand. The generator power available from the electric traction system during regenerative braking is also used to recharge the battery or ultracapacitor, however, the fuel cell system must continue to operate to maintain ancillary loads, such as the compressor, coolant pump, and the power converter module (PCM), collectively known as the parasitic loads.

There is a need in the art for a method of placing the fuel cell system in a stand-by mode during regenerative braking to enable the system to utilize the regenerative braking power available when the battery or ultracapacitor has been adequately charged to support parasitic loads, thereby improving the mileage of the vehicle by reducing the amount of hydrogen used. Normally, such utilization of regenerative braking power is prevented by the presence of a blocking diode between the fuel cell system and the electric traction system. Thus, when the electric traction system generates more energy than the energy storage device and power distribution module (PDM) can consume, mechanical braking is used, which increases wear on the brakes as well as wastes hydrogen. A method for utilizing the regenerative braking power upstream of the blocking diode is therefore needed to enable the fuel cell system to enter a stand-by mode and decrease the amount of hydrogen consumed.

SUMMARY OF THE INVENTION

In accordance with the teachings of the present invention, a method for operating a fuel cell stack in a stand-by mode is disclosed where electrical energy from regenerative braking is used to operate system loads instead of using fuel cell stack power to conserve hydrogen. A fuel cell stack and an ultracapacitor are electrically coupled to a high voltage electrical bus. A blocking diode is provided in the electrical bus to isolate the fuel cell stack from the ultracapacitor. A by-pass line is provided around the blocking diode including a by-pass contactor. A stack contactor is provided to disconnect the fuel cell stack from the electrical bus. A stand-by mode request is made if the voltage at a node proximate to the blocking diode closest to the ultracapacitor is higher than the voltage at a node proximate to the blocking diode closest to the fuel cell stack. Steps are then made to electrically prepare the high voltage electrical bus. Then, the stack contactor is opened and the by-pass contactor is closed to allow the regenerative braking energy to power the system loads.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for entering and exiting a regenerative/stand-by mode on a fuel cell system is merely exemplary in nature, and is in no way intended to limit the invention or its applications or uses.

Figure 1:
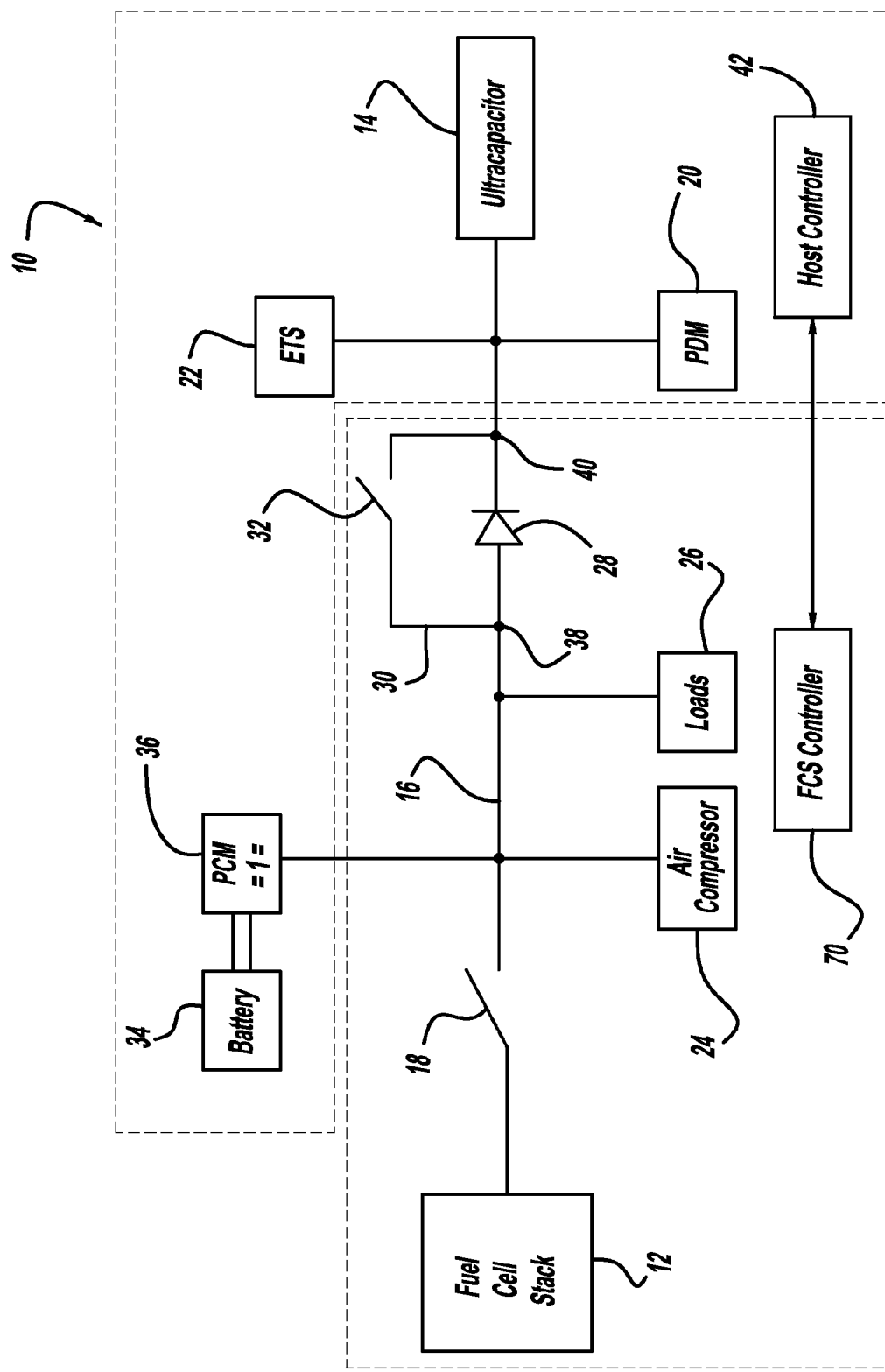
FIG. 1 is a schematic block diagram of a hybrid fuel cell system employing a fuel cell stack, an electric traction system, and an ultracapacitor, according to an embodiment of the present invention.

FIG. 1 is a schematic block diagram of a vehicle system 10 including a fuel cell stack 12, an electric traction system 22, and an ultracapacitor 14 electrically coupled to a high voltage electrical bus 16. Although an ultracapacitor is employed in this non-limiting embodiment as a supplemental power source, other high voltage DC storage devices can be employed instead of the ultracapacitor 14, such as a high voltage battery. A fuel cell stack contactor 18 selectively connects and disconnects the fuel cell stack 12 to the high voltage electrical bus 16. Various electrical components are electrically coupled to the high voltage electrical bus 16, such as a power distribution module (PDM) 20. Additionally, an air compressor 24 for providing air to the cathode side of the fuel cell stack 12 and ancillary loads 26 are electrically coupled to the electrical bus 16.

The fuel cell stack 12 and the ultracapacitor 14 can have different output voltages, where the voltage of the ultracapacitor 14 is higher and could damage the fuel cell stack 12. For example, a higher voltage on the ultracapacitor 14 may be a result of regenerative braking energy captured through the electric traction system 22. A high voltage blocking diode 28 is typically provided in the high voltage electrical bus 16 to protect the fuel cell stack 12 from the voltage of the high voltage DC power source 14. Additionally, a system voltage (SYSVLT) node 38 is provided upstream of the blocking diode 28 and an electric traction system voltage (ETSVLT) node 40 is provided downstream of the blocking diode 28 to monitor the voltage difference upstream and downstream of the blocking diode 28. However, at system start-up, when the fuel cell stack 12 is not operating, energy from the ultracapacitor 14 is necessary to operate various system loads, such as the air compressor 24. Also, during certain times, such as during regenerative braking, it may be advantageous to utilize this energy, as will be discussed in detail below.

A fuel cell system (FCS) controller 70 controls the fuel cell components of the system 10 and a host controller 42 controls the vehicle components of the system 10 as shown by the dotted boxes, where the controllers 70 and 42 are in communication with each other over a CAN bus.

In order to allow the DC voltage from the ultracapacitor 14 or regenerative braking from the electric traction system 22 to power the air compressor 24 and the ancillary loads 26, it is necessary to by-pass the blocking diode 28. Therefore, a by-pass line 30 is provided around the blocking diode 28, and a by-pass contactor 32 is provided in the by-pass line 30 so as to selectively allow the blocking diode 28 to be by-passed. During system start-up, the PDM 20 opens the fuel cell stack contactor 18 and closes the by-pass contactor 32 so that electrical energy from the ultracapacitor 14 can go around the blocking diode 28 and power the air compressor 24 and the ancillary loads 26, without damaging the fuel cell stack 12. Additionally, at times when the voltage downstream of the blocking diode 28 is higher than the upstream voltage, such as during regenerative braking, the FCS controller 70 may open the fuel cell stack contactor 18 and close the by-pass contactor 32 to allow current to go around the blocking diode 28 if requested by the host controller 42, which will be described in more detail below.

The vehicle system 10 also includes a low voltage battery 34, such as a 12-volt car battery. The battery 34 can provide power to various system and vehicle components that do not require high voltage. However, during certain times, it is desirable to convert the 12-volt DC potential from the battery 34 to a high voltage low power potential to power certain system components. To provide this conversion, a 12 volt-to-high-voltage converter, or power converter module (PCM) 36 is provided. The high voltage from the PCM 36 can be used to drive the air compressor 24 to start the fuel cell stack 12 during those times when the ultracapacitor 14 may be dead or not have enough power to do so, and is accomplished by putting the PCM 36 into a "boost mode". Also, during those times when the voltage downstream of the blocking diode 28 is higher than the voltage upstream, the by-pass line 30 may allow high voltage to be converted by the PCM 36 to a 12 volt DC potential for charging the battery 34. This is called a "buck mode" and will also be discussed in more detail below.

During certain periods of braking, such as extended braking when driving down a decline, the electric traction system 22 is able to generate power through regenerative braking. The power generated can be used to charge the ultracapacitor 14, and to run the air compressor 24 and the ancillary loads 26, as well as to charge the battery 34. Once the air compressor 24 and the ancillary loads 26 are supported by the power from the electric traction system 22 during regenerative braking, the fuel cell stack 12 enters a stand-by mode. This allows for the conservation of hydrogen by channeling the power from the regenerative braking event upstream of the blocking diode via a by-pass line, thereby utilizing the power to operate the air compressor 24 and the ancillary loads 26 during times when the fuel cell stack 12 is in the stand-by mode. It also reduces the wear caused by mechanical braking.

Figure 2:
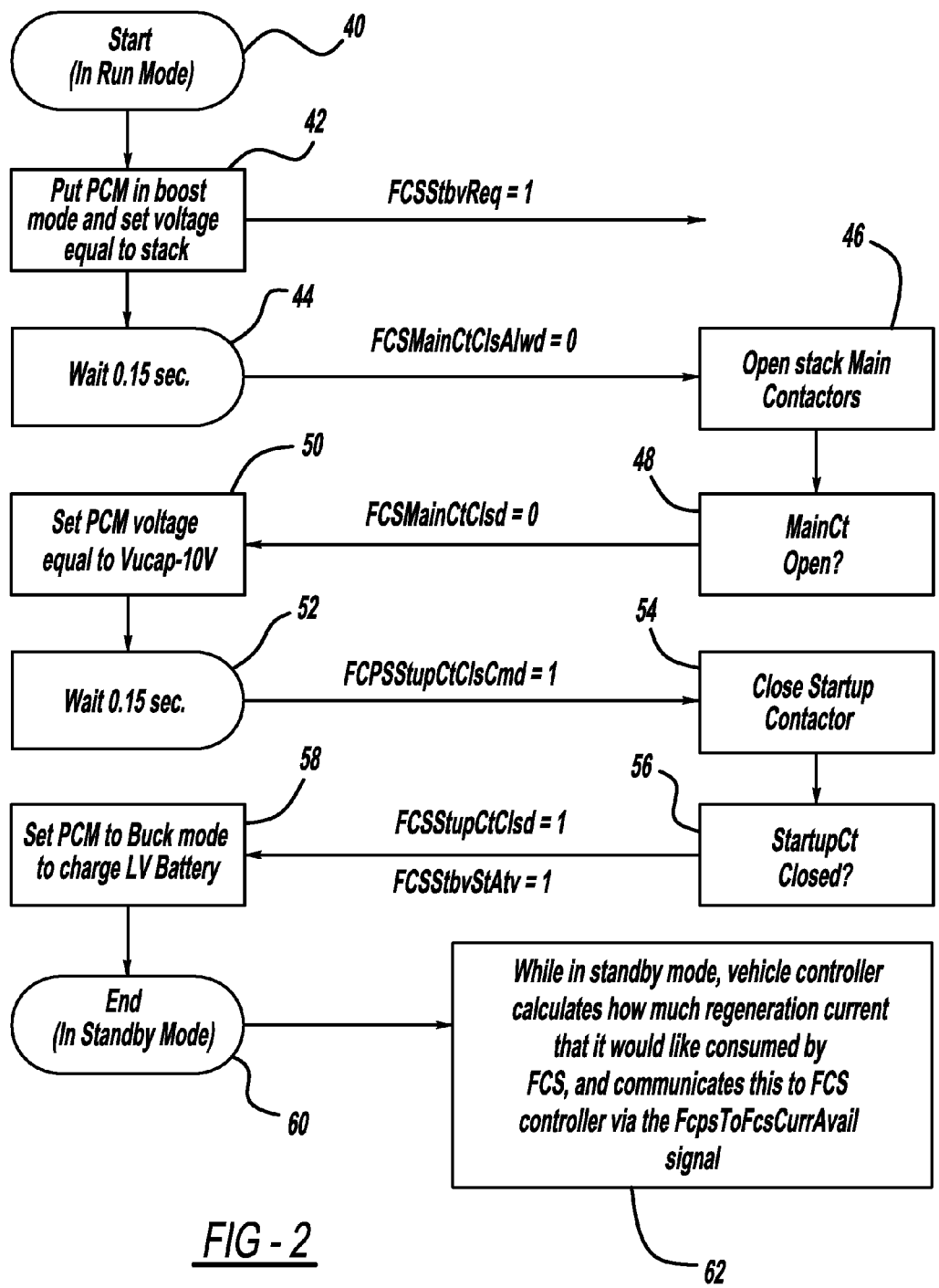
FIG. 2 is a flow chart diagram showing a start-up process for entering the fuel cell stack into a stand-by mode.

FIG. 2 is a flow chart diagram 44 showing a start-up process for putting the fuel cell stack 12 into a stand-by mode. At a start box 46, the fuel cell stack 12 is charging the ultracapacitor 14 as needed. Once the FCS controller 70 recognizes that a stand-by request for the fuel cell stack 12 is present, it will set the PCM 36 to the "boost mode" and set the voltage equal to the fuel cell stack voltage at box 48. There may be several triggers for a stand-by request, where one such trigger may be when the PDM 20 recognizes that the voltage at the ETSVLT node 40 downstream of the blocking diode 28 is higher than the voltage at the SYSTVLT node 38 upstream of the blocking diode 28, such as during regenerative braking.

The reason the PCM 36 is set to the "boost mode" and the voltage is set equal to the fuel cell stack voltage once a stand-by request is recognized at the box 48 is to charge the bus 16. This must be done before the stack contactor 18 is opened to ensure that the air compressor 24 and the ancillary loads 26 do not lose power. After the PCM 36 is set to the boost mode at the box 48 a waiting period is initiated at box 50. This waiting period is to ensure the PCM 36 is set and the bus 16 is properly charged. After the waiting period has expired, the fuel cell stack contactor 18 is opened at box 52. The FCS controller 70 checks to ensure that the fuel cell stack contactor 18 is open at box 54 as a system check. If the fuel cell stack contactor 18 is open, the host controller 42 sets the PCM voltage equal to the voltage of the ultracapacitor 14 minus a predetermined voltage, such as 10 volts, at box 56. This ensures that the voltage upstream of the blocking diode 28 is close to the voltage downstream of the blocking diode 28, but not higher. If the voltage is higher there will be forward flow, hence the PCM 36 is set slightly below to ensure a reverse bias voltage. Additionally, if the voltage differential is too high, the contactors may be damaged. Thus, a 10 volt difference in voltage spread is chosen in this non-limiting embodiment. Other reasonable voltage spreads may be used.

Once the PCM 36 is set to the ultracapacitor voltage minus 10 volts at the box 56, a waiting period is initiated at a box 58. This waiting period ensures the correct voltage upstream of the blocking diode 28 has been achieved prior to closing the by-pass contactor 32. After the waiting period, typically 0.15 seconds, is over the by-pass contactor 32 is closed at box 60. Once the by-pass contactor 32 is closed, the energy captured from the regenerative braking can travel through the by-pass line 30 and be utilized to power the air compressor 24 and the ancillary loads 26.

The system checks to ensure the by-pass contactor 32 has been closed at box 62. This step is an optional system check which may not be needed. Once the FCS controller 70 determines the by-pass contactor 32 has been closed at the box 62, the FCS controller 70 sets the PCM 36 to a "buck mode" at box 64, thereby allowing the energy from either the regenerative braking of the electric traction system 22 or the ultracapacitor 14 to charge the low voltage battery 34. At box 66, the sequence to enter the fuel cell stack 12 into stand-by is completed, and the host controller 42 calculates how much regeneration current is consumed by the fuel cell system, including the air compressor 24 and the ancillary loads 26, which is then communicated to the FCS controller 70. This allows the system to cause the fuel cell stack 12 to stop generating current, and thus to stop consuming hydrogen. The energy from the regenerative braking is thus utilized to power devices normally powered by the fuel cell stack 12, such as the air compressor 24 and the ancillary loads 26. Not only does this save hydrogen, but it also allows the vehicle to continue utilizing regenerative braking, which means mechanical braking, and the wear associated therewith, is reduced.

Figure 3:
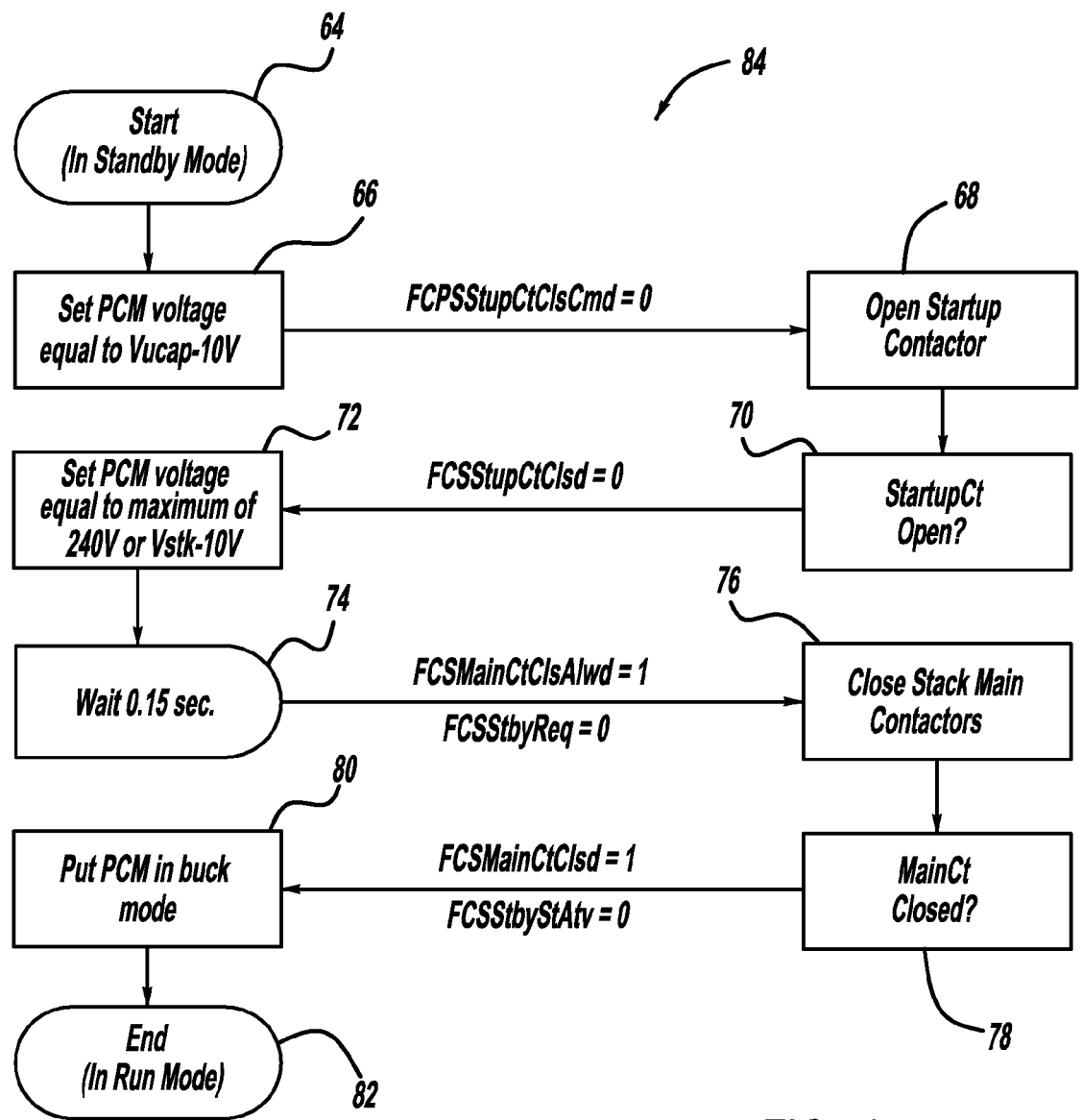
FIG. 3 is a flow chart diagram showing an exit process for exiting the fuel cell stack from the stand-by mode.

Once the regenerative braking ends, or any other such event that is determined to be a trigger, the stand-by period ends and the steps to exit the stand-by mode are initiated. FIG. 3 is a flow chart diagram 72 showing an exit process for exiting the stand-by mode. The steps for exiting the fuel cell stack 12 from the stand-by mode are initiated at box 74. An example of an event triggering the exit procedure from the stand-by mode is when the level of charge of the ultracapacitor 14 falls below a certain level, however, many different triggers may exist. At box 76 the PCM voltage is set equal to the voltage of the ultracapacitor minus 10 volts, as was done at the box 56. This causes the PCM 36 to operate in the "boost mode" again, thereby only allowing energy to flow from the battery 34 (instead of charging the battery 34) to charge the bus 16.

Next, the by-pass contactor 32 is opened at box 78. This terminates the current flowing upstream on the by-pass line 30, thereby only allowing current to flow downstream of the blocking diode 28. A check is performed at box 80 to ensure that the by-pass contactor 32 has been opened. Once the system determines that the by-pass contactor 32 has been opened, the PCM 36 is set to a voltage that is the maximum of the voltage of the stack minus 10 volts and 240 volts, at box 82. This allows the PCM 36 to have enough power to operate the air compressor 24 and the ancillary loads 26 while the fuel cell stack 12 is coming out of the stand-by mode and climbing in voltage output, yet prevents a voltage differential across the bus 16, which could damage the fuel cell stack contactor 18.

Next, there is a waiting period at box 84, which allows time for the fuel cell stack 12 to produce enough voltage to operate the system. After the waiting period at the box 84, the stack contactor 18 is closed at box 86. The system will then check to ensure the stack contactor 18 is closed at box 88. Once the system verifies that the stack contactor 18 has been closed at the box 88, the PCM 36 is again put in the "buck mode," thereby allowing the fuel cell stack 12 to charge the low voltage battery 34 at box 90. Finally, the stand-by mode is considered over at box 92 where the system 10 is again operating in the normal manner.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for operating a fuel cell system in a stand-by mode, said method comprising:
providing a high voltage electrical bus;
providing a fuel cell stack electrically coupled to the high voltage electrical bus;
providing a high voltage DC-power energy storage device electrically coupled to the high voltage electrical bus;
providing an electric traction system electrically coupled to the high voltage electrical bus;
providing a blocking diode in the high voltage electrical bus that prevents voltage from the high voltage energy storage device and the electric traction system from being applied to the fuel cell stack;
providing a by-pass line including a by-pass contactor around the blocking diode;
providing a fuel cell stack contactor between the fuel cell stack and the high voltage electrical bus;
determining that the voltage at a first node in the electrical bus coupled to the blocking diode opposite to the fuel cell stack is higher than the voltage at a second node in the electrical bus coupled to the blocking diode closer to the fuel cell stack; and
putting the system in the stand-by mode by opening the fuel cell stack contactor and closing the by-pass contactor so that electrical energy from the electric traction system goes around the blocking diode when the voltage at the first node is higher than the voltage at the second node.

2. The method according to claim 1 wherein putting the system in the stand-by mode includes electrically coupling a power converter module to the high voltage electrical bus and setting the voltage of the power converter module equal to the voltage of the fuel cell stack when the voltage at the first node is higher than the voltage at the second node.

3. The method according to claim 2 wherein putting the system in the stand-by mode includes waiting a predetermined period of time after the voltage of the power converter module has been set to the voltage of the fuel cell stack before opening the fuel cell stack contactor.

4. The method according to claim 3 wherein putting the system in the stand-by mode includes setting the voltage of the power converter module equal to the voltage of the power storage device minus a predetermined voltage after the fuel cell stack contactor is opened.

5. The method according to claim 4 wherein the by-pass contactor is closed a predetermined period of time after the voltage of the power converter module is set to the voltage of the power storage device minus the predetermined voltage.

6. The method according to claim 2 further comprising electrically coupling a 12 volt battery to the power converter module to provide high voltage to charge the high voltage electrical bus.

7. The method according to claim 1 wherein the electric traction system generates the electrical energy through regenerative braking.

8. The method according to claim 1 wherein providing a high voltage DC-power energy storage device includes providing an ultracapacitor.

9. The method according to claim 1 wherein the electrical energy from the electric traction system operates a system air compressor and ancillary loads.

10. The method according to claim 1 further comprising taking the system out of the stand-by mode if the voltage of the energy storage device falls below a predetermined voltage.

11. A method for operating a fuel cell system on a vehicle, said method comprising:
    determining that an electric traction system on the vehicle is generating energy through regenerative braking;
    disconnecting a fuel cell stack from a high voltage bus; and
    by-passing a blocking diode that electrically isolates the fuel cell stack from a high power source to allow the regenerative braking energy to flow to system loads electrically coupled to the high voltage bus.

12. The method according to claim 11 wherein determining that an electric traction system on the vehicle is generating energy through regenerative braking includes determining that a voltage on one side of a blocking diode in a high voltage bus is higher than the voltage at another side of the blocking diode.

13. A method for placing a fuel cell stack of a hybrid fuel cell system into and out of stand-by, said method comprising:
    providing a high voltage electrical bus;
    providing a fuel cell stack electrically coupled to the high voltage electrical bus;
    providing a high voltage DC-power energy storage device electrically coupled to the high voltage electrical bus;
    providing an electric traction system electrically coupled to the high voltage electrical bus;
    providing a blocking diode in the high voltage electrical bus that prevents voltage from the high voltage power storage device and the electric traction system from accessing the fuel cell stack, where the voltage on the bus downstream of the blocking diode is measured at a first node in the electrical bus near the electric traction system and the high voltage DC power storage device, and where the voltage upstream of the blocking diode is measured at a second node in the electrical bus near the fuel cell stack;
    providing a by-pass line with a by-pass contactor around the blocking diode;
    providing a fuel cell stack contactor between the fuel cell stack and the high voltage electrical bus;
    determining that the voltage at the first node in the electrical bus is higher than the voltage at the second node;
    opening the fuel cell stack contactor and placing the fuel cell stack in a stand-by mode when the voltage downstream of the blocking diode at the first node is higher than the second node upstream of the blocking diode;
    closing the by-pass contactor in the by-pass line so that electrical power from the electric traction system or high voltage DC storage device goes around the blocking diode when a higher voltage exists downstream of the blocking diode so that the high voltage from the electric traction system or high voltage DC power storage device is able to operate system loads;
    determining when to remove the fuel cell stack from the stand-by mode;
    removing the fuel cell stack from the stand-by mode and opening the by-pass contactor; and
    closing the fuel cell stack contactor to connect the fuel cell stack to the high voltage electrical bus.

14. The method according to claim 13 wherein putting the system in the stand-by mode includes electrically coupling a power converter module to the high voltage electrical bus and setting the voltage of the power converter module equal to the voltage of the fuel cell stack when the voltage at the first node is higher than the voltage at the second node.

15. The method according to claim 14 further comprising electrically coupling a 12 volt battery to the power converter module to provide high voltage to charge the high voltage electrical bus.

16. The method according to claim 13 wherein putting the system in the stand-by mode includes setting the voltage of the power converter module equal to the voltage of the power storage device minus a predetermined voltage after the fuel cell stack contactor is opened.

17. The method according to claim 16 wherein the by-pass contactor is closed a predetermined period of time after the voltage of the power converter module is set to the voltage of the power storage device minus the predetermined voltage.

18. The method according to claim 13 wherein removing the fuel cell stack from the stand-by mode includes setting the voltage of the power converter module to the voltage of the fuel stack minus a predetermined voltage and opening the by-pass contactor.

19. The method according to claim 18 wherein the fuel cell stack contactor is closed once the desired voltage output of the fuel cell stack is achieved.

20. The method according to claim 13 wherein removing the fuel cell stack from the stand-by mode includes removing the fuel cell stack from the stand-by mode if the voltage of the energy storage device falls below a predetermined voltage.

* * * * *